United States Patent [19]
Matsuura et al.

[11] Patent Number: 5,918,695
[45] Date of Patent: Jul. 6, 1999

[54] MOTORCYCLE SHAFT DRIVE ASSEMBLY

[75] Inventors: Tatsuya Matsuura; Hiroyuki Aiba; Kenji Abe, all of Iwata, Japan

[73] Assignee: Yamaha Hatsudoki Kabushiki Kaisha, Shizuoka, Japan

[21] Appl. No.: 08/733,653

[22] Filed: Oct. 17, 1996

[30] Foreign Application Priority Data

Oct. 18, 1995 [JP] Japan ................................ 7-269780
Oct. 18, 1995 [JP] Japan ................................ 7-269859

[51] Int. Cl.⁶ .................................................. B62D 61/02
[52] U.S. Cl. ............................................................ 180/226
[58] Field of Search ............................ 280/284; 180/219, 180/226, 227

[56] References Cited

U.S. PATENT DOCUMENTS

| | | |
|---|---|---|
| 4,811,810 | 3/1989 | Watanabe . |
| 5,067,580 | 11/1991 | Parker ..................................... 180/226 |
| 5,263,549 | 11/1993 | Dick ........................................ 180/226 |

FOREIGN PATENT DOCUMENTS

| | | | |
|---|---|---|---|
| 932890 | 9/1955 | Germany ............................... | 180/226 |
| 279821 | 10/1952 | Switzerland ........................... | 180/226 |
| 505420 | 5/1939 | United Kingdom ................... | 180/226 |

*Primary Examiner*—Lanna Mai
*Assistant Examiner*—Avraham H. Lerner
*Attorney, Agent, or Firm*—Knobbe, Martens, Olson & Bear LLP

[57] ABSTRACT

A motorcycle shaft drive assembly which provides for easy removal of the rear wheel, drive shaft and final drive assembly is disclosed. The motorcycle has a rear frame section pivotally connected to a front frame section. A rear wheel and final drive assembly are removably connected to the rear frame section. A drive shaft extends from the output of an engine mounted on the front frame section to the final drive assembly. The drive shaft extends into a coupling member at the engine output. A support is provided for the drive shaft when the rear wheel, drive shaft and final drive assembly are being removed from or installed onto the remainder of the motorcycle.

9 Claims, 10 Drawing Sheets

5,918,695

MOTORCYCLE SHAFT DRIVE ASSEMBLY

FIELD OF THE INVENTION

The present invention relates to a motorcycle frame and shaft drive assembly, and more particularly to a such an assembly which allows for simple removal of the rear wheel, drive shaft and final drive assembly of a motorcycle.

BACKGROUND OF THE INVENTION

As is well known, motorcycles generally include a frame assembly that is made up of a welded-up construction. The typical frame construction includes a headpipe at the front of the frame and which dirigibly supports the front wheel via a steerable front fork assembly. From this headpipe, there extends generally rearwardly and in somewhat downward fashion one or more main tubes. In addition, down tubes also are affixed at their forward ends to this headpipe and extend downwardly and rearwardly. At the rear ends, the main tubes and down pipes are joined, frequently by a bracket assembly. This bracket assembly provides a support for the rear wheel and/or the rear wheel suspension mechanism. Although the shape of the individual frame members may vary, the described construction generally is the type utilized on the great majority of the motorcycles.

In this motorcycle design, the engine is mounted to the frame assembly, generally resting upon the down tubes. An drive shaft extends from a crankcase transmission assembly of the engine. The drive shaft extends rearwardly to a final drive housing mounted adjacent the rear wheel on the frame. In some instances, the drive shaft extends through one of the tubes of the frame assembly between the final drive housing and the crankcase transmission assembly.

This particular frame construction is generally satisfactory in that it supports the motorcycle and its components. This frame construction is undesirable from the standpoint that the rear wheel and drive assembly are not readily serviceable.

It is a principal object of the present invention to provide a motorcycle frame assembly which allows for simple removal of the rear wheel and drive assembly.

SUMMARY OF THE INVENTION

The present invention is a motorcycle frame assembly which allows for simple removal of the rear wheel and drive assembly. The motorcycle includes a front frame assembly and rear frame assembly, the rear frame assembly pivotable with respect to the front frame assembly.

The front frame assembly includes a head pipe. A front wheel is mounted to a front fork which is rotatably mounted to the head pipe. A down tube and a main tube extend from the head pipe. An engine is mounted to the front frame assembly, the engine having an output.

A final drive assembly and rear wheel are mounted to the rear frame assembly. A drive shaft extends between the engine output and the final drive assembly. A first end of the drive shaft extends into a coupling member for coupling the output of the engine to the drive shaft. The coupling member includes a support member positioned therein for aligning the end of the drive shaft for coupling to the engine output.

Means are provided on the rear frame assembly for supporting the drive shaft when the drive shaft is disengaged from the coupling member.

Further objects, features, and advantages of the present invention over the prior art will become apparent from the detailed description of the drawings which follows, when considered with the attached figures.

DETAILED DESCRIPTION OF THE PREFERRED EMBODIMENT

Figure 1:
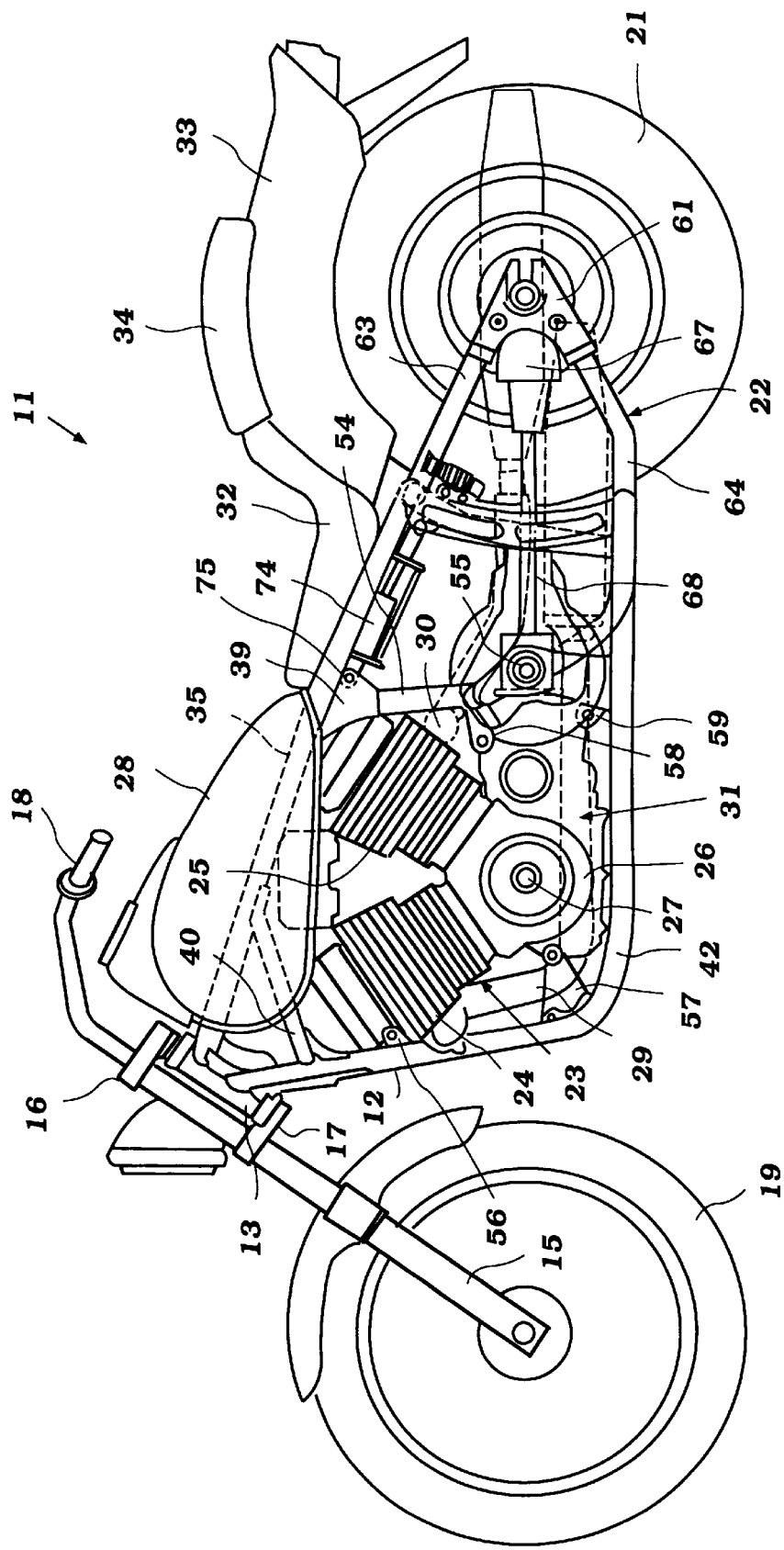
FIG. 1 is a perspective view of a motorcycle of the present invention, the motorcycle including a front frame section and a rear frame section which is removable from the front frame section.

FIG. 1 illustrates a motorcycle 11 in accordance with the present invention. The motorcycle 11 includes a welded-up type of tubular frame assembly. The frame assembly generally comprises a front frame assembly, indicated generally by the reference numeral 12, and a rear frame or trailing arm assembly 22. The front frame assembly 12 is formed primarily from tubular members which may have round or other suitable configurations, and includes a headpipe 13. The construction of the frame 12 will be described later in more detail by reference to FIGS. 2–4.

The headpipe 13 journals a front fork assembly 15 by means including a pair of upper and lower brackets 16 and 17. A handlebar assembly 18 is carried at the upper end of this front fork 15 for steering of a front wheel 19 which is rotatably journalled at the lower end of the fork 15 in a known manner.

At the rear end of the front frame assembly 12, a rear wheel 21 is suspended by means of a welded-up rear frame or trailing arm assembly, indicated generally by the reference numeral 22, for suspension movement about a pivot point, to be described, which is formed by the main frame assembly 12 and forwardly of the rear terminus thereof.

An internal combustion engine, indicated generally by the reference numeral 23, is supported within the open portion of the frame assembly in a manner which will be described. The engine 23 may be of any desired configuration, but a V-type engine is depicted so as to show how the frame assembly will accommodate relatively large engines and still render those engines accessible without sacrificing the features of strength and ease of accessibility.

The engine, therefore, has a pair of angularly inclined cylinder banks 24 and 25 in each of which one or more cylinder bores are formed. These cylinder banks 24 and 25 are joined to a combined crankcase transmission assembly, indicated generally by the reference numeral 26, in which the engine crankshaft 27 rotates about an axis that extends transversely to the longitudinal center line of the motorcycle 20. As is typical, the crankcase transmission assembly 26 includes a change speed transmission which, in the preferred embodiment of the invention, has a transversely extending output shaft 68 which drives the rear wheel 21 in a manner which will also be described.

Mounted on the frame assembly 12 rearwardly of the handlebar assembly 18 and headpipe 13, and nested therebetween, is a fuel tank 28. The fuel tank 28 supplies fuel to the engine 23 through a suitable fuel supply system. In addition, a charge forming system of any known type, and one which is preferably at least partially positioned between the cylinder banks 24 and 25, delivers a combustible mixture to the engine. This mixture is then burned and discharged to the atmosphere through an exhaust system which includes, in part, exhaust manifolds 29 and 30 and a muffler, tailpipe assembly 31. Since the invention deals primarily with the frame 12, further details of the construction and operation of the engine 23 and its auxiliaries is not believed to be necessary to permit those skilled in the art to practice the invention. However, from the following description, it will be readily apparent to those skilled in the art how the frame assembly 12 provides maximum access for servicing of the various components of the motorcycle 20.

A rider's seat 32 is carried by the frame assembly 12 to rear of the fuel tank 28 and accommodates the rider/operator. A fender 33 covers the rear wheel 23 and carries an auxiliary seat 34 for accommodating a passenger. It is to be understood that the layout of the various components carried by the frame assembly 12 may also be of any known type and/or configuration. Again, however, from the description of the frame assembly, it is believed to be readily apparent how the invention permits a wide variety or wide latitude of configurations to be employed and accommodated without sacrificing accessibility of the various components.

Figure 2:
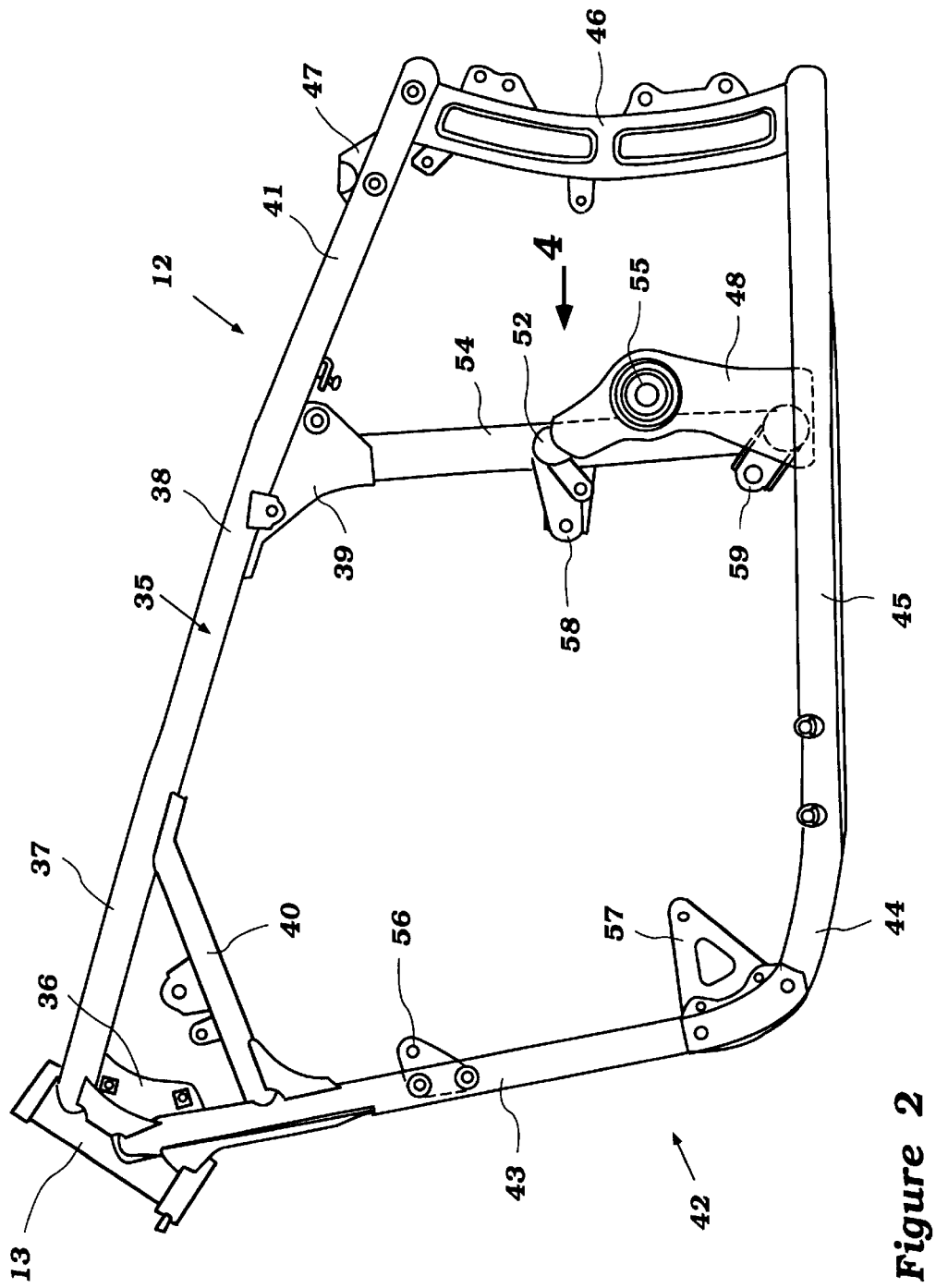
FIG. 2 is a side view of the front frame section of the motorcycle illustrated in FIG. 1.
Figure 3:
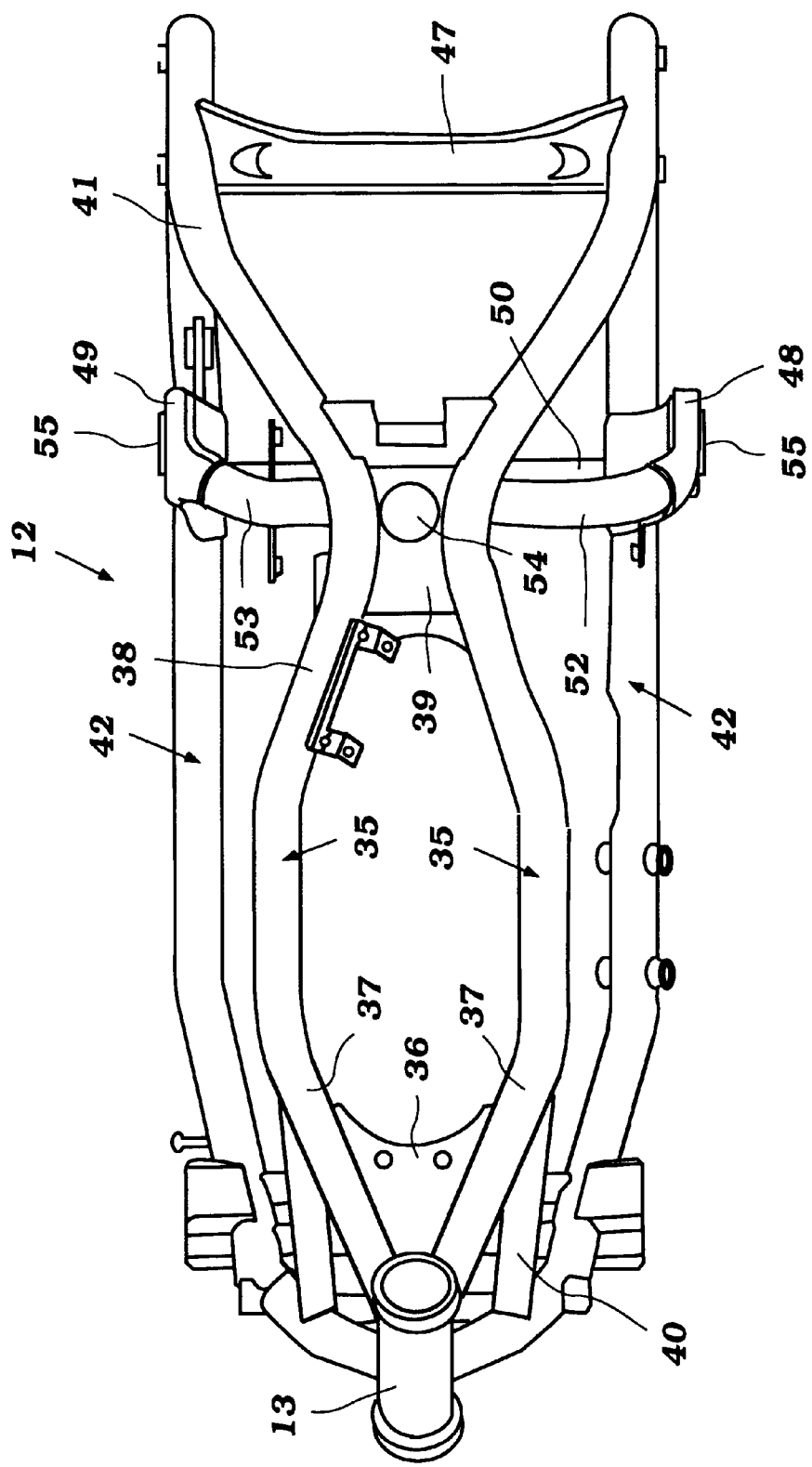
FIG. 3 is a top view of the front frame section illustrated in FIG. 2.

The construction of the frame assembly 12 will now be described in more detail, and by particular reference to FIGS. 2–4. Although these figures are employed to describe the frame construction, it is obviously apparent that the frame components, or at least major portions of them, also appear in FIG. 1.

As has been noted, a headpipe 13 dirigibly supports the front wheel 19 and its supporting fork assembly 15. The headpipe is disposed at the upper forwardmost portion of the frame assembly 12 and defines a steering axis that is inclined rearwardly from a vertical plane at an acute angle. A pair of main frame members, each indicated by the reference numeral 35, are connected at their forward ends to the headpipe 13, as, for example, by welding. In the illustrated embodiment, the main tubes 35 are tubular. As has been noted, however, these main frame tubes 35 may have any desired configuration.

A reinforcing gusset 36 is welded between the headpipe 13 and the main tubes 35 at their forward ends and where the main tubes 35 diverge outwardly toward a pair of forward parallel portions 37 that run substantially along the area where the fuel tank 28 is positioned. Rearwardly of this area, and forwardly of but in proximity to the front part of the rider's seat 32, these main tubes 35 have converging portions 38 which are joined to a reinforcing bracket 39 which serves a purpose which will be described later.

Rearwardly of this bracket 39, the main tubes 35 bow outwardly again to provide spread-apart rear sections 41, which extend parallel to but are disposed substantially transversely outwardly of the forward portions 37. This entire configuration also is inclined downwardly and rearwardly, as best seen in FIGS. 1 and 2.

Affixed to the headpipe 13 downwardly and slightly forwardly of the point of connection of the main tubes 35 are a pair of down tubes, indicated generally by the reference numeral 42. In the illustrated embodiment, the down tubes 42 are also tubular in configuration, and the reinforcing gussets 36 may also function to reinforce their upper connections to the headpipe 13. The forward portion of the down tubes 42 extends generally vertically downwardly in relatively straight sections 43. These sections curve at 44 at their lower ends and then the down tubes 42 extend rearwardly in a generally horizontal direction with portions 45 forming this configuration. It should be seen that the portions 45 are spaced generally transversely outwardly of the parallel portions 37 of the main tubes 35. This provides a wider support base while maintaining a relatively narrow upper portion so as to permit a more comfortable riding position for the rider.

Reinforcing cross-members 40 are interconnected between mid-points of the main tubes 35 and corresponding upper portions of the down tubes 42 so as to add to the rigidity of the structure without interfering with its generally open configuration.

It will be seen that the main tubes 35 and down tubes 42, and specifically the rearward portions thereof, comprised of the parts 41 and 45, terminate adjacent and forwardly of the rear wheel 21. Thus, the rear ends of these portions are spaced apart and arcuate bridging reinforcing brackets 46 are welded therebetween so as to form a generally closed configuration, as seen in side elevational view. At the upper ends of the brackets 46, there is provided a reinforcing cross-member 47 which is also affixed, as by welding, across the upper ends of the main tube portions 41 and in proximity to the brackets 46.

The rear ends of the main tube portions 41 and down tube portions 45 are spaced apart a considerable distance and are bridged by the reinforcing bridging brackets 46 to provide a more open configuration.

In this construction, the rear wheel suspension is provided by means of a pair of side brackets 48 and 49, each of which is affixed to a respective one of the down tube portions 46 well forwardly of the reinforcing brackets 46. These brackets 48 and 49 have affixed to their upper ends respective tubular portions 52 and 53 which, as will be seen in FIG. 4, have different vertical extents. The portion 52 extends higher than the portion 53, where the portions cross over toward the longitudinal center of the motorcycle. This provides clearance on the left-hand side, as seen in FIG. 2, for the drive shaft and other components for the rear wheel suspension system, as will become apparent. These portions 52 and 53 are of a generally tubular configuration; however, other configurations may be employed.

Where the portions 52 and 53 meet in an offset manner at the longitudinal center of the motorcycle 20, they are connected to a vertically extending frame tube 54. This frame tube 54 is connected at its lower end to a reinforcing cross-tube 50 that spans the lower tube portions 45 forwardly of the brackets 46 and which is welded thereto. The upper end of this reinforcing tube 54 is welded to the aforenoted reinforcing bracket 39 so as to provide a very rigid structure that is disposed within the open portion of the frame assembly 12, without significantly obstructing it.

Each of the side members 48 and 49 forms a respective pivot joint 55 for the rear wheel suspension system, as will be described shortly. As may be seen in the view of FIG. 4, the reinforcing tube 54 preferably has an oval configuration, as shown at 54a, in FIG. 4. This provides a wider area for support and more extent in the fore and aft or longitudinal direction than in the transverse direction so as to provide good strength and minimum weight.

The vertical portions 43 of the down tubes 42 carry upper and lower engine mounts 56 and 57, respectively, that are connected to the front cylinder bank 24 and crankcase transmission assembly 26 for supporting the forward end of the engine 23. The rear cross-tubes 52 and 53 carry brackets 58, and the lower tube 50 carries brackets 59, which support the transmission crankcase assembly 26 at the rear end.

Figure 8:
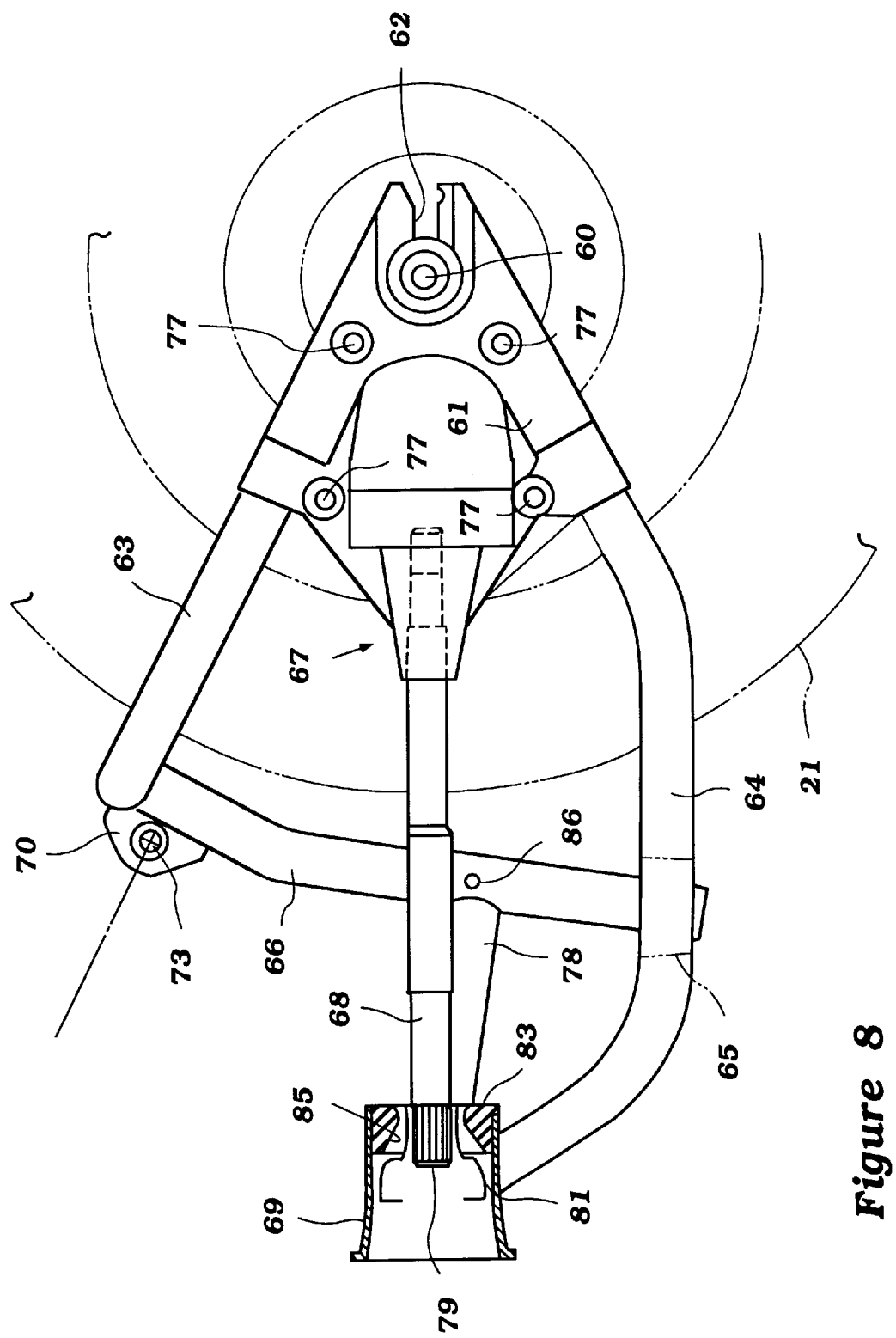
FIG. 8 is a side view of the rear frame section including a rear wheel mounted thereto and a drive shaft.
Figure 9:
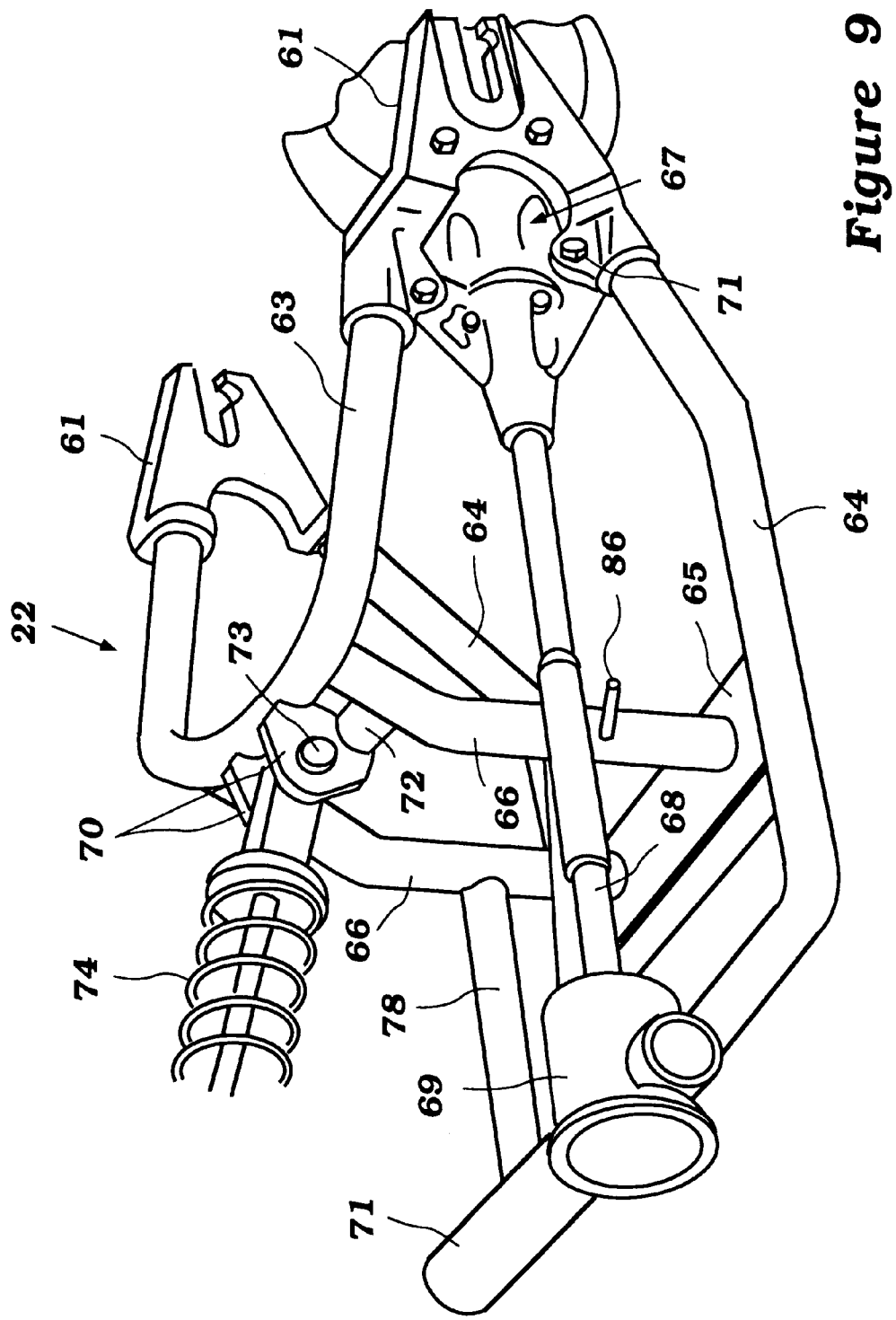
FIG. 9 is a perspective view of the rear frame section of the motorcycle illustrated in FIG. 1, including the drive assembly.

The trailing arm or rear frame construction 22 will now be described by particular reference to FIGS. 5–9, while its connection to the frame assembly 12 (a "front" frame assembly), as thus far described, will subsequently be described by reference to FIGS. 1 and 4. Referring first to FIG. 9, the trailing arm assembly 22 includes a pair of spaced-apart brackets 61 that have slotted ends 62 for receiving the axle shaft 60 upon which the rear wheel 21 is journalled. The brackets 61 are connected at their upper ends to a U-shaped tubular member 63. The lower portions of the brackets 61 are connected by means of a longer U-shaped tubular member 64.

A cross-brace or cross-member 65 spans the forward arm portions of the lower member 64. Reinforcing tubes 66 are welded between this cross-member 65 and the upper tubular member 63 and similar tubes 78 are welded between those tubes 66 and a cross-tube 71 described below, so as to provide a very rigid structure.

The bracket 61 at one side of the motorcycle carries a final drive housing 67 that contains a ring and pinion gear for driving the rear wheel 21 in a known manner. The final drive housing 67 is preferably connected to the bracket 61 via a number of bolts 77. As illustrated, four bolts 77 extend through the bracket 61 into threaded bores in the housing 67.

The pinion gear of the final drive is driven by the drive shaft 68 which extends forwardly and which forms a coupling member 69 for disconnectable connection to the aforenoted output shaft of the transmission in the crankcase transmission assembly 26. As best illustrated in FIG. 8, the coupling member 69 houses a splined end 79 of the drive shaft 68. In addition, a universal joint 81 for connection to the output of the transmission is provided in the coupling member 69.

A support pin 86 extends from the cross-brace 66. The support pin 86 is positioned below the drive shaft 68.

An annular support 83 is positioned in the coupling member 69 for maintaining the position of the splined end 79 of the drive shaft 68 and the joint 81. The annular support 83 is preferably a ring of durable elastic material positioned about the splined end 79 of the drive shaft 68. As illustrated, the support 83 includes a tapered surface 85 for accommodating the joint 81.

Figure 4:
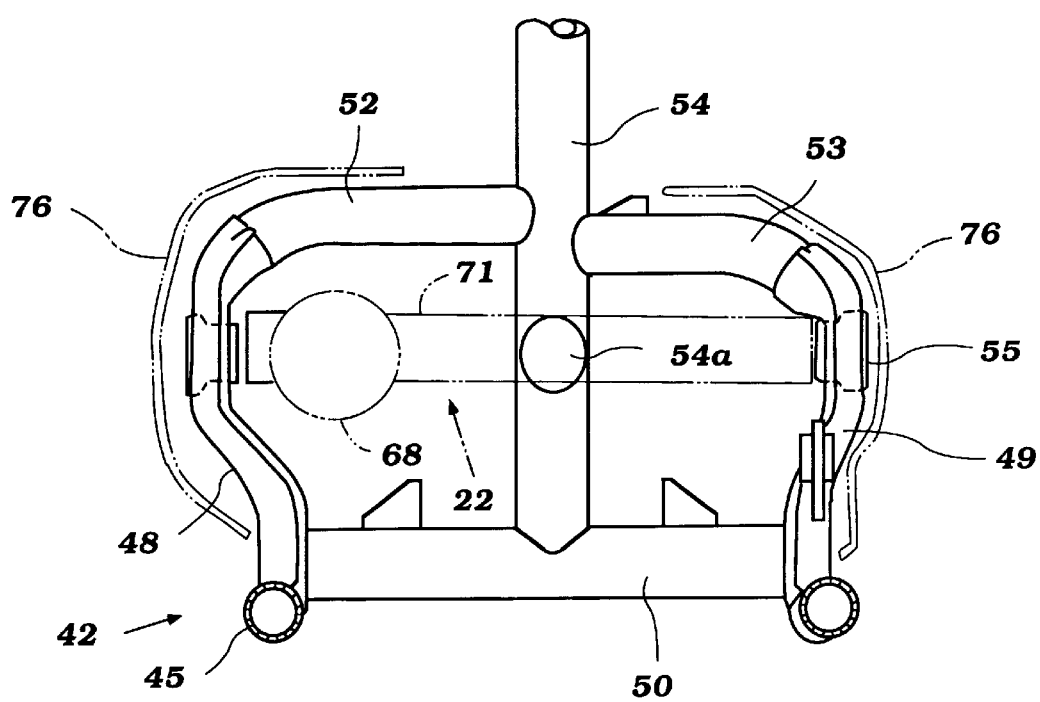
FIG. 4 is a partial sectional end view of the assembled front and rear frame sections of the motorcycle, taken in the direction of arrow 4 in FIG. 2.

This coupling member is affixed to a cross-tube 71 which, as seen in FIG. 4, provides the pivotal connection to the pivot joint 55 for pivotal movement of the trailing arm assembly 22 relative to the main frame 12. This pivot point is well forward so that a large wheel suspension is available with small pivotal degrees of pivotal movement for a relatively large vertical movement of the wheel 21.

Figure 5:
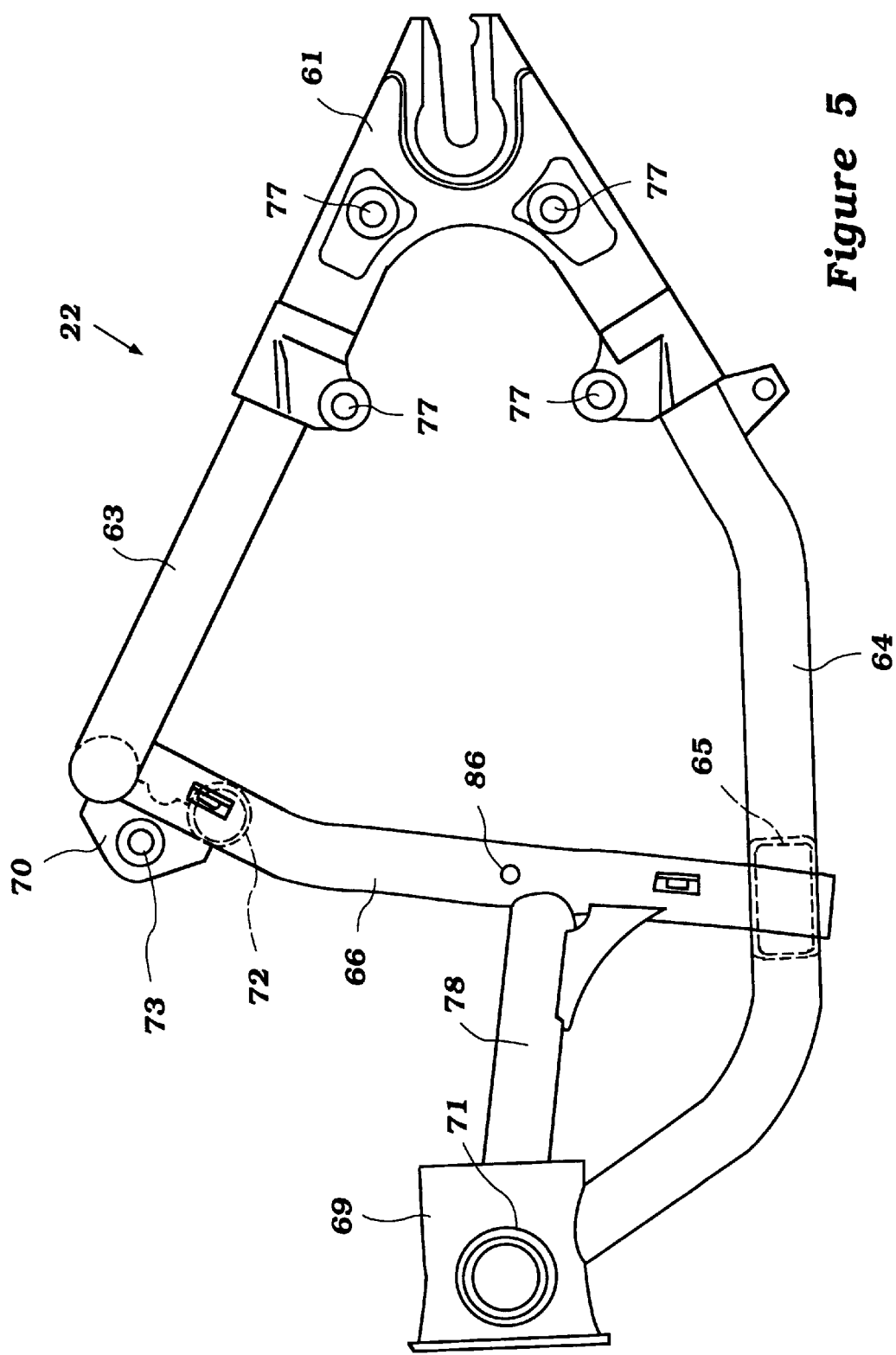
FIG. 5 is a side view of the rear frame section of the motorcycle illustrated in FIG. 1.
Figure 6:
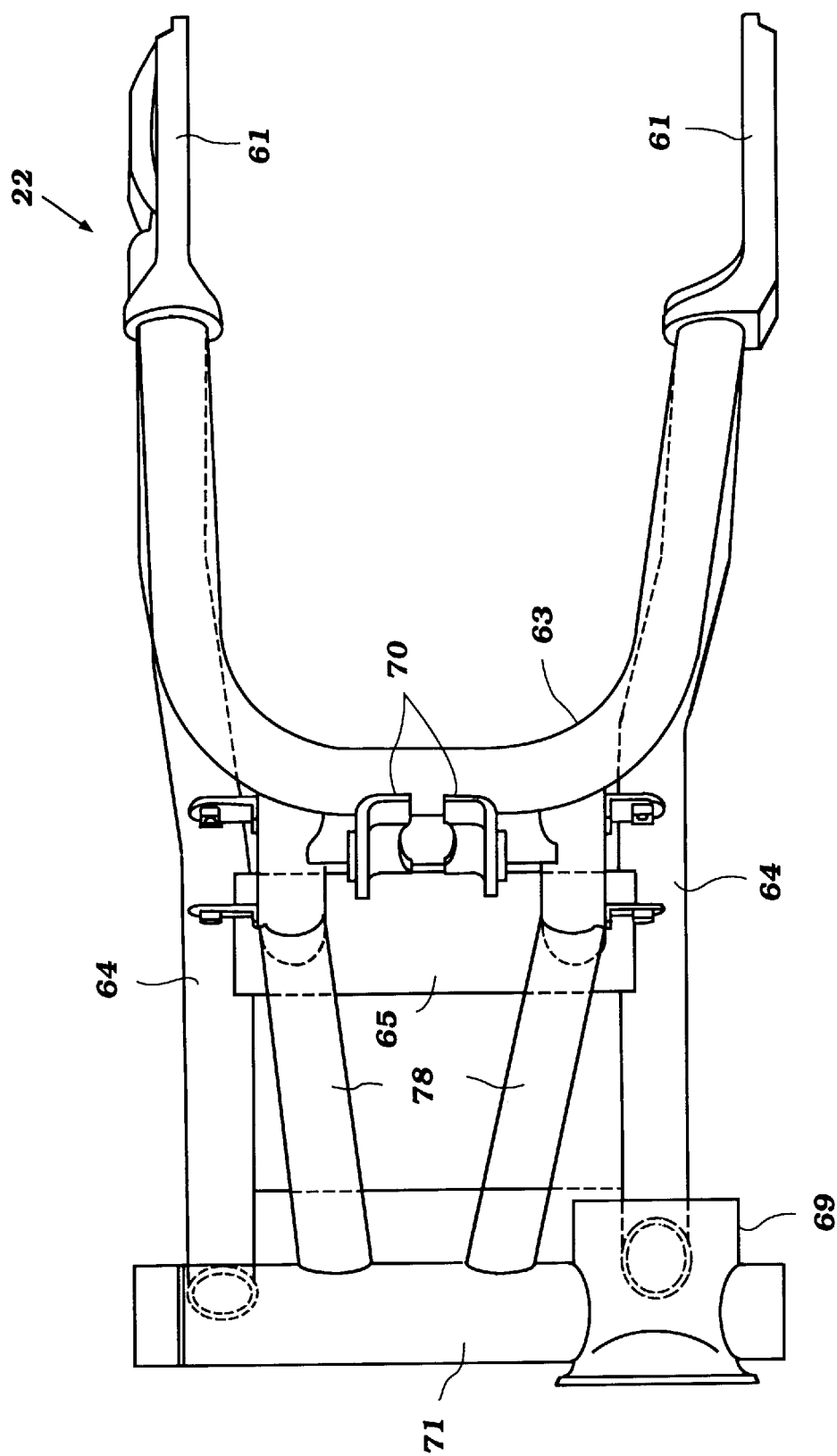
FIG. 6 is a top view of the rear frame section illustrated in FIG. 5.
Figure 7:
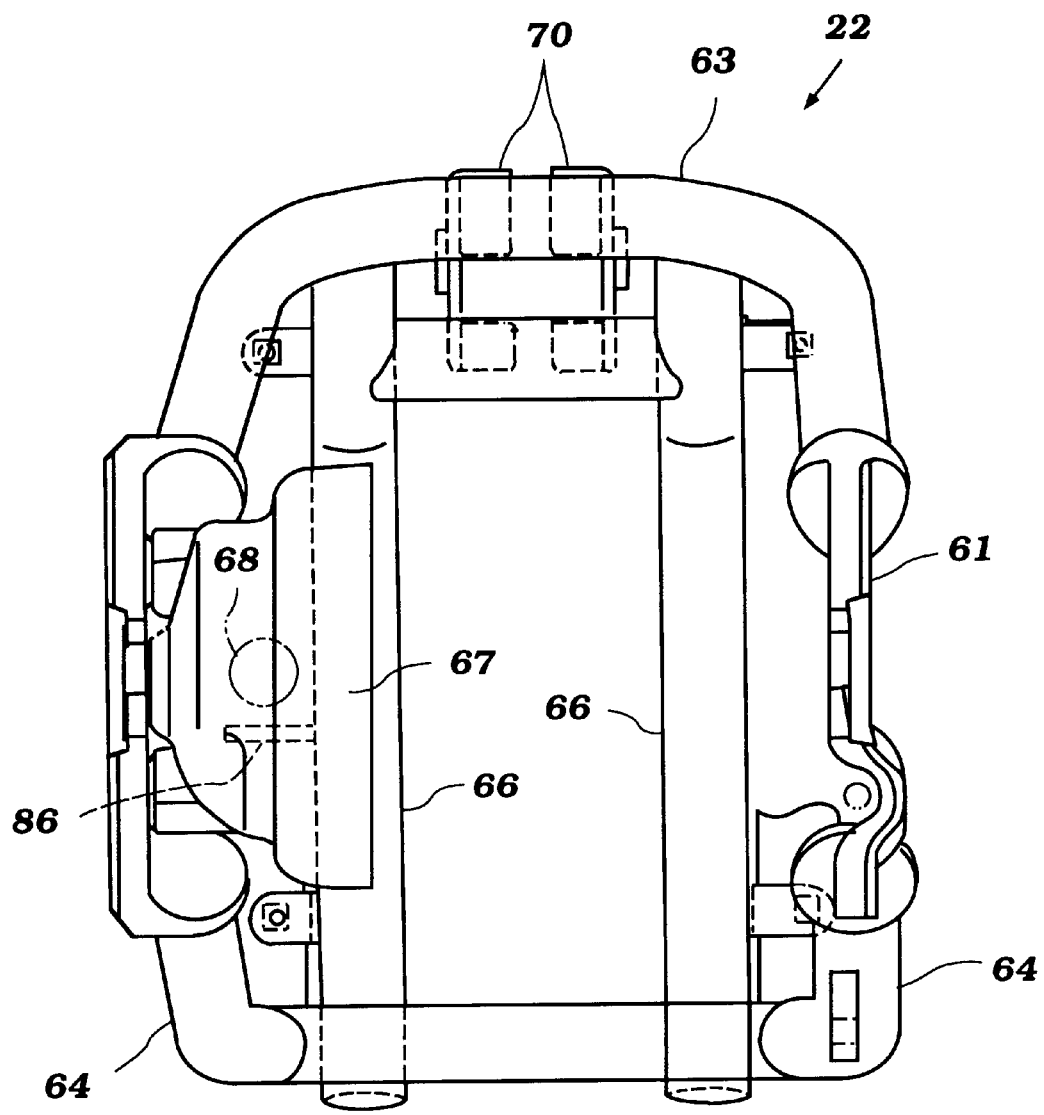
FIG. 7 is an end view of the rear frame section illustrated in FIG. 6.

As may be seen in FIGS. 5 and 1, the cross-braces 66 are interconnected by a cross-tube 72 that carries a mounting assembly 70 for a pivot pin 73 that is connected to a combined spring and shock absorber mechanism 74. The opposite end of this spring and shock absorber member 74 is pivotally connected as at 75 to the upper bracket 39 of the frame assembly so as to load the spring and shock absorber assembly 74 upon suspension movement of the rear wheel.

As may be seen in FIG. 4, body covers 76 may be affixed to and overlie portions of the frame assembly to give a neat appearance while, at the same time, facilitating servicing through ready removal.

Figure 10:
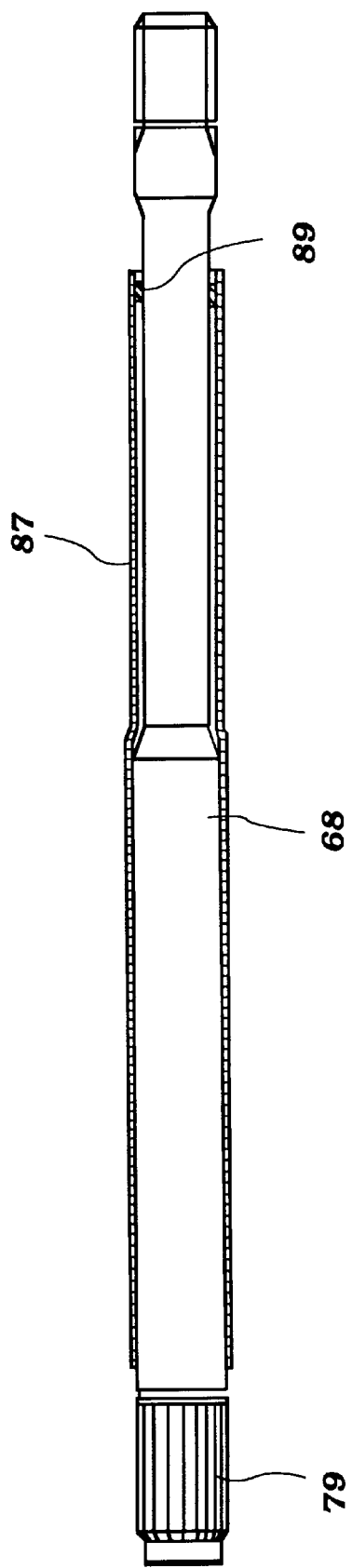
FIG. 10 is a side view of the drive shaft of the motorcycle of FIG. 1.

As best illustrated in FIGS. 1, 8 and 9, the positioning of the drive shaft 68 outside of the frame assembly 20 provides for a unique look to the motorcycle 11. In order to enhance this look, the portion of the drive shaft 68 extending between the transmission assembly 26 and the final drive assembly 67 is positioned within a chrome-plated tube 87. As illustrated in FIG. 10, this tube 87 has an inner diameter which is nearly equal to the outer diameter of the drive shaft 68 along a portion of the shaft 68. A second portion of the tube 87, however, has an inner diameter which is greater than the outer diameter of the drive shaft 68, whereby the tube 87 does not contact the drive shaft 68. To provide support of the tube 87 along this portion, a ring-shaped spacer 89 is mounted between the tube 87 and drive shaft 68 near the end of the tube.

The tube 87 effectively covers the drive shaft 68 along its visible portion, creating the image that the drive shaft 68 itself is chrome plated. This arrangement is superior, however, to the chrome plating of the drive shaft 68 itself. In particular, the mounting of the tube 87 in the above-described fashion is such that the torquing drive force transmitted through the drive shaft 68 is not transmitted to the chrome plating, preventing cracking of the plating.

The assembly disclosed above also has the advantage that the rear wheel 21, final drive assembly 67 and drive shaft 68 may be easily removed from the motorcycle 11 for servicing. For removal, the bolts 77 connecting the final drive assembly 67 to the trailing arm assembly at the bracket 61 are removed. The final drive assembly 67, rear wheel 21, and drive shaft 68 may then be pulled rearwardly from the frame assembly of the motorcycle 11.

In reassembly, the axle 60 supporting the rear wheel 21 is aligned with the ends 62 of the brackets 61. The rear wheel 21 (and final drive assembly 67 and drive shaft 68 connected thereto) are rolled slightly forwardly until supported by the trailing arm assembly. At this time, the drive shaft 68 is supported in a generally horizontal position on the pin 86.

The splined end 79 of the drive shaft 68 is aligned with the coupling member 69, and the rear wheel 21 is moved forwardly until the drive shaft 68 extends into the coupling member 69. Notably, the support 83 within the coupling member 69 maintains the position of the joint 81 for easy re-alignment of the drive shaft 68. The bolts 77 are then reconnected.

In order to facilitate easy removal of the rear wheel 21 and drive assembly, the length of the slotted ends 62 of the brackets 61 exceeds the distance the splined end 79 of the drive shaft 68 must be extended into the coupling member 69. In this manner, the axle 60 may be positioned in the brackets 61 and supported thereby in a first step with the drive shaft 68 not yet engaging the coupling member 69. This allows the assembler to then move forward and align the drive shaft 68 without having to at the same time align the axle 60 and rear wheel 21.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A frame assembly for a wheeled vehicle, said frame assembly comprised of a front frame assembly and a rear frame assembly pivotally connected to said front frame assembly, said front frame assembly adapted for steerable coupling to at least one front wheel and for supporting an engine having an output shaft, said rear frame assembly adapted to support at least one rear wheel and a final drive assembly and drive shaft for driving said at least one rear wheel, said rear frame assembly further including a first coupling member for encircling a forward end of said drive shaft and for removably coupling said drive shaft to said engine output and a second coupling member for removably coupling said final drive assembly and said at least one rear wheel to said rear frame assembly, whereby said at least one rear wheel, final drive assembly and drive shaft are selectively connectable to and removable from said rear frame assembly as one component.

2. The frame assembly in accordance with claim 1, wherein said first coupling member comprises a hollow body pivotally connected to the front frame assembly.

3. The frame assembly in accordance with claim 1, wherein said second coupling member comprises a slot formed in a mounting portion of said rear frame assembly, said slot for accepting an axle on which said rear wheel is connected.

4. The frame assembly in accordance with claim 1, further including a support member positioned within said first coupling member for supporting the front end of the drive shaft when not coupled to the engine output shaft.

5. The frame assembly in accordance with claim 4, wherein said support member comprises an elastic ring.

6. The frame assembly in accordance with claim 1, further including a universal joint for coupling said drive shaft to said engine output.

7. The frame assembly in accordance with claim 1, further including drive shaft supporting means for supporting the drive shaft when said drive shaft is not coupled to said engine output.

8. The frame assembly in accordance with claim 7, wherein said drive shaft supporting means comprises a pin extending from said rear frame assembly and underlying the drive shaft.

9. The frame assembly in accordance with claim 1, wherein said second coupling means comprises at least one bracket formed by said rear frame assembly for accepting an axle on which said at least one rear wheel is mounted, said bracket having an acceptance portion, the length of said acceptance portion being longer than a distance by which said drive shaft extends into said first coupling member so that said axle may be inserted into said acceptance portion before said drive shaft extends into said first coupling member on assembly.

* * * * *